United States Patent Office 3,558,532
Patented Jan. 26, 1971

3,558,532
METHOD FOR MAKING ETHYLENE POLYMER FOAMS
Donald J. Sundquist and Nicholas W. Howell, Midland, Mich., assignors to The Dow Chemical Company, Midland, Mich., a corporation of Delaware
No Drawing. Filed Apr. 10, 1968, Ser. No. 720,392
Int. Cl. C08f 29/04, 47/10
U.S. Cl. 260—2.5
7 Claims

ABSTRACT OF THE DISCLOSURE

The invention relates to improvements in the production of ethylene polymer foams, and pertains especially to nucleating agents for controlling the size of the cells and the resiliency of the foam.

---

This invention relates to the production of foamed ethylene polymers. It relates more particularly to nucleating agents for controlling the size of the pores or cells and the resiliency of the foam.

It is known to prepare porous or expanded polyethylene by incorporating a gas or a liquified normally gaseous foaming agent in the molten polymer under pressure and to expand the polymer by a reduction in pressure during an extrusion process. For many purposes, it is desirable to produce the foam in the form of a sheet or rod. When the compositions are extruded it is difficult to obtain a foam in which the cell size is uniform and of small diameter and which foam has a smooth skin and good resiliency. Foams having cells of about two millimeters diameter or larger and of non-uniformity are less resilient than is desired for many purposes and restricts greatly the utility for which the foam may otherwise be well suited.

It is a primary object of the invention to provide a method and improved agents for producing ethylene polymer foams of fine pores or cells and good resiliency. Another object is to provide a novel combination of agents which possess a synergistic action for controlling the size of the pores and the resiliency of the foam produced by an extrusion process from a resinous normally solid ethylene polymer. A further object is to provide a method and novel agents for making ethylene polymer foams of uniform fine cells or pores, e.g. substantially indistinct to the naked eye, and which foams have improved softness and resiliency.

According to the invention the foregoing and related objects are obtained by blending or otherwise incorporating a resinous normally solid non-rubbery ethylene polymer, a volatile organic blowing agent and a novel nucleating agent consisting essentially of a mixture of calcium silicate or magnesium silicate and calcium stearate with one another, bringing the mixture to a uniform temperature between 90° and 200° C. under pressure to form a flowable gel and thereafter extruding the gel into a zone of sufficiently lower pressure, e.g. the atmosphere, to cause the extruded material to expand with resultant formation of a cellular or porous ethylene polymer foam.

The ethylene polymers to be employed are the resinous normally solid non-rubbery and non-wax-like homopolymers and copolymers of ethylene. Among suitable polymers are: polyethylene and copolymers of ethylene with up to about 10 mole percent of one or more other aliphatic monoolefins having from three to eight carbon atoms such as 2-butene, 1-pentene, 1-hexene, 4-methyl-1-pentene, 1-heptene, 1-octene, 4-ethyl-1-hexene, and the like; resinous copolymers of at least 65 weight percent ethylene and up to 35, preferably up to 30, weight percent of vinyl acetate or vinyl propionate; and resinous copolymers of at least 70 weight percent ethylene and up to 30, preferably up to 25, weight percent of an acrylic acid ester having the general formula:

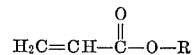

wherein R is an alkyl radical having from one to eight carbon atoms, such as ethyl acrylate, butyl acrylate, isobutyl acrylate, propyl acrylate, amyl acrylate, hexyl acrylate, 2-ethylhexyl acrylate and octyl acrylate.

The nucleating agents possessing a synergistic action for controlling the size of the pores or cells and the resiliency of the foam consist essentially of (1) finely divided magnesium silicate or calcium silicate such as "Silene" or diatomaceous earth, and (2) calcium stearate. The calcium silicate or magnesium silicate may constitute from 5 to 95 percent by weight of the sum of the weights of the nucleating agents, and correspondingly the calcium stearate may constitute from 95 to 5 percent by weight of the sum of the weights of said agents.

It may be mentioned that said nucleating agents may comprise or be used in admixture with other additives such as calcium carbonate, calcium oxide or calcium hydroxide, or aluminum, barium, zinc, and magnesium salts of said higher fatty acids, or barium sulfate. The nucleating agents, i.e. the mixture of said agents, can be used in amounts of from about 0.2 to 2 percent by weight or more of the weight of the ethylene polymer. Larger amounts can be used, but are not required.

The organic foaming agent should be a poor solvent or a non-solvent for the polymer, but should be soluble or dissolve in the ethylene polymer in an amount up to about 30 percent by weight, sufficient to form a mobile or flowable gel and to expand the polymer gel upon release of the pressure to produce a cellular body. It follows that the foaming agent can be a volatile compound boiling at temperatures below about 100° C. at atmospheric pressure. Suitable organic foaming agents are:

butane,
pentane,
hexane,
tetramethylmethane,
monochlorotrifluoromethane,
hexafluoroethane,
monobromotrifluoromethane,
monochlorodifluoromethane,
monochloropentafluoroethane,
dichlorodifluoromethane,
octafluorocyclobutane,
dichlorotetrafluoroethane,
dichlorofluoromethane,
trichlorofluoromethane and
trichlorotrifluoroethane.

Mixtures of any two or more of such volatile organic compounds can also be used. The foaming agent can be used in amounts corresponding to from 2 to 30 grams per 100 grams of the ethylene polymer used.

A typical formulation for making polyethylene foam is given in the recipe.

| Ingredient: | Parts by weight |
| --- | --- |
| Polyethylene | 100 |
| 1,2-dichlorotetrafluoroethane | 24 |
| Calcium stearate | 1 |
| "Silene" (principally finely divided calcium silicate) | 0.5 |

The mobile or flowable gel is prepared by placing the ingredients under pressure of the dichlorotetrafluoroethane foaming agent, suitably at temperatures above the crystalline melting point of the polymer, e.g. at from 90° to 200° C., such as by heating the ingredients in a pressure resistant vessel until a homogeneous or substantially uniform flowable gel is obtained. Thereafter, the pressure is released and the gel is allowed to expand.

The mobile gel is preferably and advantageously prepared in a plastics extruder wherein the ethylene polymer and the nucleating agent in the desired proportions are fed to the barrel of the plastics extruder wherein they are pressed, heated and the polymer is melted or heat-plastified, i.e. converted to a flowable plastic condition, then is mixed with the volatile organic blowing agent under pressure in a mixing zone within the barrel of said extruder or an extension thereof in which the mixture of ingredients is brought to a temperature between about 90° and 200° C. as a uniform gel. The gel is extruded from the pressured mixing zone into a zone of lower pressure, e.g. the atmosphere, wherein the volatile organic foaming agent expands the extrudate and forms a cellular body.

The gel is preferably extruded at a temperature near or above the melting point of the ethylene polymer, but higher or lower temperatures can be used. The temperature at which the gel is extruded into the zone of lower pressure will vary depending in part upon the size and arrangement of the apparatus used, the rate of extrusion of the gel, the melting point of the ethylene polymer, and the proportions and kind of volatile organic foaming agent, and the kind of ethylene polymer used, e.g. whether polyethylene, or a copolymer of ethylene and say 30 percent by weight vinyl acetate.

In general, the gel can be extruded at a temperature of from 25° C. below the temperature at which crystallization of the ethylene polymer causes an observable cloudiness of the gel, up to a temperature of 25° C. above the melting point of the polymer. The temperature at which crystallization of the polyethylene causes a cloudiness of the gel can readily be determined by a simple test such as by sealing weighed amounts of the polymer and the foaming agent in a glass tube, heating the mixture above the melting point of the polymer to obtain a transparent uniform gel, then cooling or allowing the gel to cool and observing the temperature at which the gel becomes hazy or cloudy. The temperature at which an observable cloudiness of the gel occurs is herein referred to as the "cloud point."

The pressure to be maintained on the gel prior to its extrusion into a zone of lower pressure should be approximately as high as that of the vapor pressure of the volatile organic blowing agent under the conditions used and preferably such as to allow slight foaming in the extruder. Pressures of from about 300 to 2000 pounds per square inch or higher, gauge pressure, can be used.

The ethylene polymer foams are light weight essentially closed cell foams having a density of from about one to ten pounds per cubic foot, with the cells ranging for different polymer of sizes from about one millimeter diameter to smaller sizes indistinct to the naked eye, and for a given polymer foam of substantially uniform sizes throughout. The foams are useful as insulation, in packaging applications for protecting fragile objects, for making gaskets and as energy absorbing material.

The following examples illustrate ways in which the principle of the invention has been applied, but are not to be construed as limiting its scope.

EXAMPLE 1

Polyethylene having a melt index of 2 and a density of 0.919 in the form of granules, together with 1 percent by weight of a mixture of two parts by weight of powdered calcium stearate and one part by weight of "Silene," principally finely divided calcium silicate, as nucleating agent, was fed into a plastics extruder at a rate corresponding to 18 pounds of the mixture per hour. The plastics extruder employed in the experiment comprised a four foot long barrel having a 2½ inch diameter screw equipped with a mixing head similar in design to that described in U.S. Pat. No. 2,453,088, and a sealing plate positioned midway of the screw. An inlet to the barrel of the extruder was provided adjacent to the sealing plate for feed of a volatile organic compound as blowing agent into the barrel and into contact with the heat-plastified polyethylene. The sealing plate formed a constricted passageway between the rim of the plate and the bore of the barrel so that flow of the heat-plastified polyethylene through the constricted passageway by pressure of the flights of the screw formed as effective plastic seal against counter-current flow or leakage of the volatile organic compound from the extruder. The heat-plastified polyethylene was forwarded under pressure of the screw around the sealing plate and into the second section of the barrel of the extruder wherein it was mixed with 1,2-dichlorotetrafluoroethane fed thereto at a rate of 1.78 pounds per hour. The resulting mixture was blended under pressure, principally by action of the mixing head on the screw of the extruder, into a uniform composition and was brought to a temperature between 98° and 100° C., then was extruded through a ⅜ inch x about ¾ inch slot orifice into the atmosphere. The extruded material was allowed to expand freely in the air. The product was a cellular oval rod having a cross-section of about 1½ inches by 1 inch. The foam was composed of fine cells having an average size or diameter of 0.43 millimeter and a density of 2.3 pounds per cubic foot.

For purpose of comparison, polyethylene foam was prepared from the same batch of polyethylene and under similar conditions employed above, except using one percent by weight based on the weight of the polyethylene, of "Silene" alone as the nucleating agent. The foamed polyethylene was composed of cells having an average size of 0.92 mm., and had a density of 2.7 pounds per cubic foot.

Another polyethylene foam was prepared in similar manner except using one percent by weight of finely divided calcium stearate alone as the nucleating agent. The foamed polyethylene had cells of average size of 1.3 mm., and had a density of 2.50 pounds per cubic foot.

EXAMPLE 2

A polyethylene foam was prepared employing 0.5 percent by weight of the mixture of "Silene" and calcium stearate as nucleating agent described in Example 1. The foamed polyethylene had cells of an average size of 0.45 millimeter and had a density of 2.3 pounds per cubic foot.

EXAMPLE 3

A polyethylene foam was prepared employing procedure similar to that employed in Example 1, except using 1 percent by weight of a mixture of two parts by weight of calcium stearate and one part by weight of magnesium silicate, as nucleating agent. The foamed polyethylene had cells having an average size of 0.46 millimeter.

EXAMPLE 4

A polyethylene foam sheet was prepared by feeding to a plastics extruder 100 parts by weight of granular polyethylene, 20 parts by weight of dichlorotetrafluoroethane and 0.4 part by weight of a mixture of 2 parts by weight of calcium stearate and 1 part by weight of "Silene," per hour and blending the ingredients into a uniform gel under pressure employing procedure similar to that employed in Example 1. The gel was brought to a temperature of 105° C. under about 950 pounds per square inch gauge pressure just prior to extruding the gel as a tube into the atmosphere. The tube of extrudate was expanded about 20 diameters by means of a trapped air bubble, after which the tube was flattened and slit. There was obtained a foam sheet 0.174 inch thick, having a density of 2.86 pounds per cubic foot a soft hand and composed of substantially uniform fine cells.

EXAMPLE 5

In each of a series of experiments, a polyethylene foam was prepared by procedure similar to that employed in Example 1, except using 1 percent by weight of the polyethylene of a mixture of calcium stearate and "Silene" (calcium silicate) in proportions as stated in the following table, as the nucleating or cell size control agent. The table identifies the experiments and gives the parts by weight of the calcium stearate and calcium silicate in the nucleating agent mixture. The table also gives the average size of the cells in the foam.

TABLE

| Run No.: | Mixed nucleating | | Foam, average cell size, mm. |
|---|---|---|---|
| | Calcium stearate, parts | Calcium silicate, parts | |
| 1 | 1 | 0 | 2.65 |
| 2 | 2 | 1 | 0.35 |
| 3 | 3 | 1 | 0.32 |
| 4 | 5 | 1 | 0.33 |
| 5 | 1 | 2 | 0.49 |
| 6 | 1 | 3 | 0.55 |
| 7 | 1 | 5 | 0.68 |
| 8 | 0 | 1 | 0.92 |

EXAMPLE 6

A foam was prepared from a copolymer of 94.5 percent by weight ethylene and 5.5 percent vinyl acetate employing procedure, nucleating agents and blowing agents as described in Example 1. The foam was composed of cells having an average size of 0.47 millimeter and had good resiliency. The copolymer foam is a new product. It is useful as padding, insulation, and as packaging material to protect fragile objects.

EXAMPLE 7

A foam was prepared from a copolymer of 80 percent by weight ethylene and 20 percent ethyl acrylate employing procedure, nucleating agents and blowing agent as employed in Example 1. The foam was composed of cells having an average size of 0.65 millimeter. The copolymer foam is a new product. It is useful as insulation and as packing material.

We claim:

1. A method for making a foamed ethylene polymer composition having fine pores and a resilient structure which method comprises intimately incorporating (A) a resinous normally solid non-rubbery ethylene polymer selected from the group consisting of (1) polyethylene and copolymers of ethylene with up to about 10 mole percent of another aliphatic monoolefin having from three to eight carbon atoms (2) copolymers of at least 65 weight percent ethylene with up to about 35 weight percent of vinyl acetate or vinyl propionate, and (3) copolymers of at least 70 weight percent ethylene and up to about 30 weight percent of an acrylic acid ester having the general formula

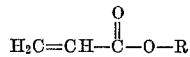

wherein R is an alkyl radical having from one to eight carbon atoms, (B) a volatile organic fluid foaming agent having a boiling point at atmospheric pressure below the melting point of the ethylene polymer, and which is a poor solvent for the ethylene polymer and (C) a nucleating agent consisting essentially of from 5 to 95 percent by weight of finely divided calcium silicate or magnesium silicate and correspondingly from 95 to 5 percent by weight of calcium stearate, with one another under superatmospheric pressure to form a flowable gel, bringing said gel to a temperature between about 90° and 200° C. and above the boiling point of the volatile organic fluid foaming agent, and thereafter extruding said gel into a zone of sufficiently lower pressure to cause the extruded material to expand with resultant formation of a cellular or porous ethylene polymer foam.

2. A method as claimed in claim 1, wherein the ethylene polymer is polyethylene.

3. A method as claimed in claim 1, wherein the ethylene polymer is a copolymer of ethylene and vinyl acetate.

4. A method as claimed in claim 1, wherein the ethylene copolymer is a copolymer of ethylene and ethyl acrylate.

5. A method as claimed in claim 1, wherein the ethylene polymer is a copolymer of ethylene and another aliphatic monoolefin having from 3 to 8 carbon atoms.

6. A method as claimed in claim 1, wherein the nucleating agent consists essentially of calcium silicate and calcium stearate.

7. A method as claimed in claim 1 wherein the nucleating agent consists essentially of magnesium silicate and calcium stearate.

References Cited

UNITED STATES PATENTS

| 2,577,743 | 12/1951 | De Long | 260—2.5(E) |
| 3,072,584 | 1/1963 | Karpovich | 260—2.5(E) |
| 3,194,854 | 7/1965 | Smith | 260—2.5(E) |
| 3,251,728 | 5/1966 | Humbert et al. | 260—2.5(E) |
| 3,491,032 | 1/1970 | Skochdopole et al. | 260—2.5(E) |

MURRAY TILLMAN, Primary Examiner

W. J. BRIGGS, SR., Assistant Examiner

U.S. Cl. X.R.

260—33.8, 86.7, 87.3, 88.1, 88.2, 94.9; 264—51, 53